Feb. 20, 1951        E. G. JOHANSSON        2,542,533

MULTIPLE SWITCH ACTUATOR

Filed Sept. 20, 1947        2 Sheets-Sheet 1

Inventor
Ernest G. Johansson
by Roberts, Cushman & Grover
Att'ys.

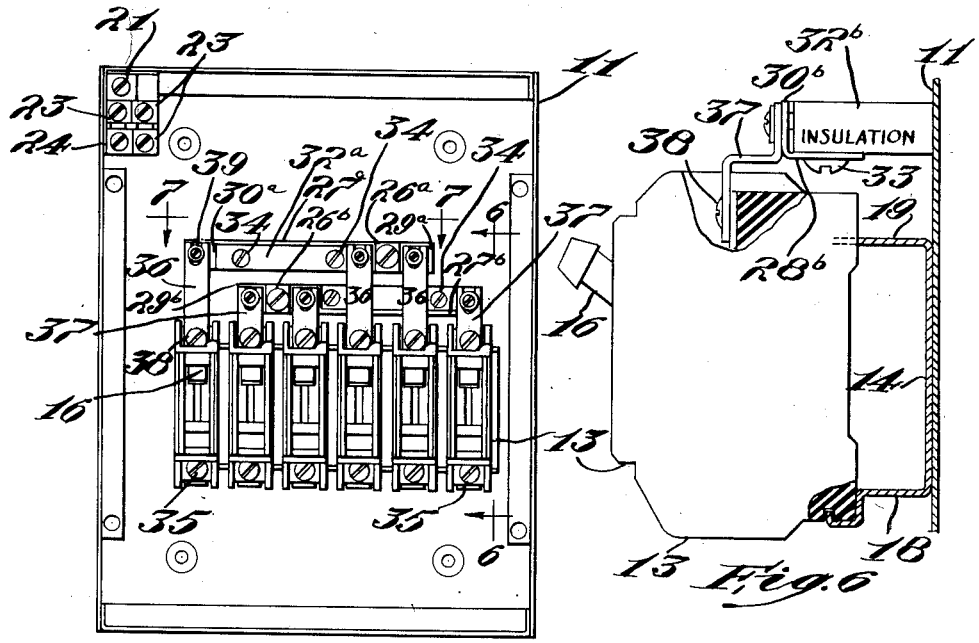
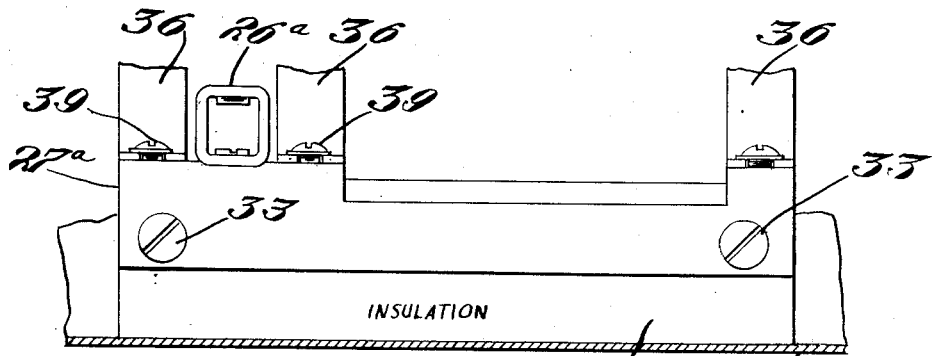
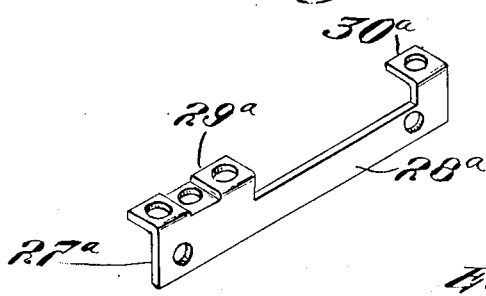
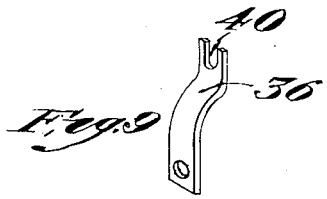

Patented Feb. 20, 1951

2,542,533

UNITED STATES PATENT OFFICE 2,542,533

MULTIPLE SWITCH ACTUATOR

Ernest G. Johansson, Belmont, Mass., assignor to Anchor Manufacturing Company, Boston, Mass., a corporation of Massachusetts Application September 20, 1947, Serial No. 775,349

2 Claims. (Cl. 200—172)

This invention relates to electrical distribution boxes of the type used in a house or an office building to enclose the circuit breakers which connect the main power supply circuit to the branch load circuits. Such boxes are constructed so that the circuit breakers can be attached to the rear wall with their reset handles projecting through frontal openings in the box cover. In this position the handles are readily accessible and can be used manually as disconnect switches to isolate one or more branch circuits from the main power supply. When the circuit breakers are used in this manner, it has been found to be desirable for safety and convenience to operate all the isolating circuit breakers conjointly.

One way of operating two or more circuit breakers conjointly is to connect an insulating sleeve between the reset handles by means of a flexible metal tie bar. This method has serious disadvantages. For example, the tie bar is not positive in operation and may fail to open one of the circuit breakers. The tie bar and sleeve may also interfere with the normal functioning of one or more of the circuit breakers under overload conditions.

Another means is to mount adjacent circuit breakers as closely as possible to one another and to bridge the remaining gap between the handles by extension members. This method also fails to provide positive opening of both the circuit breakers. Grasping of the circuit breaker handles at any point other than the adjacent ends of the extension members results in the tripping of only one circuit breaker. A further disadvantage is the possibility of overheating during severe service because of insufficient cooling air circulation between adjacent circuit breakers.

The objects of this invention are to provide a device for opening several circuit breakers conjointly, which can be operated safely and easily, which is positive in action, which does not interfere with the normal opening of the circuit breakers during overload conditions, which permits the cooling air to circulate freely around the circuit breakers, which can be used with any standard type of circuit breaker, which does not require any loose or separate parts, and which is simple and economical to manufacture.

In a broad aspect the invention contemplates a distribution box for housing a plurality of electric switches with an apertured cover through which the switch handles project, and an actuator mounted on the box cover to move between a retracted position and an advanced switch-actuating position. The actuator has surfaces to engage a plurality of switches in moving from the retracted to the advanced position, the paths of the switches being unobstructed when the actuator is in the retracted position.

In a more specific aspect a groove extending lengthwise of the path of movement of the actuator is embossed in the underside of the cover so that the upper portion of the groove is disposed along the level of the upper surface of the cover. The cover has an opening at one end of the groove through which extends a tongue of an actuator so that the actuator slides in the groove.

In still another aspect the invention comprises a distribution box of the type used to connect an electrical supply circuit to a plurality of branch load circuits by means of switches. These switches may be of the conventional single throw type or may be circuit breakers which incorporate overload protection for the branch circuits. The switches are mounted with the operating handles projecting through frontal openings in the box cover. On the box cover is a plurality of actuators each having a tongue mounted slidably in a groove in the cover and an arm extending from the tongue to contact the switch handles so that the switches, controlling each of the load circuits are opened conjointly by one of the actuators. To open all the switches simultaneously a member is slidably mounted in one or more grooves in the cover. The member incorporates a plurality of fingers to contact the arms operating the switch handles.

For the purpose of illustration a typical embodiment of the invention is shown in the accompanying drawings in which:

Fig. 5 is a front elevation of the box with the cover removed;

Fig. 6 is an enlarged partial cross-section on line 6—6 of Fig. 5;

Fig. 7 is an enlarged partial cross-section on line 7—7 of Fig. 5;

Fig. 8 is an isometric view of a bus bar;

Fig. 9 is an isometric view of a connecting strip; and

Figure 1:
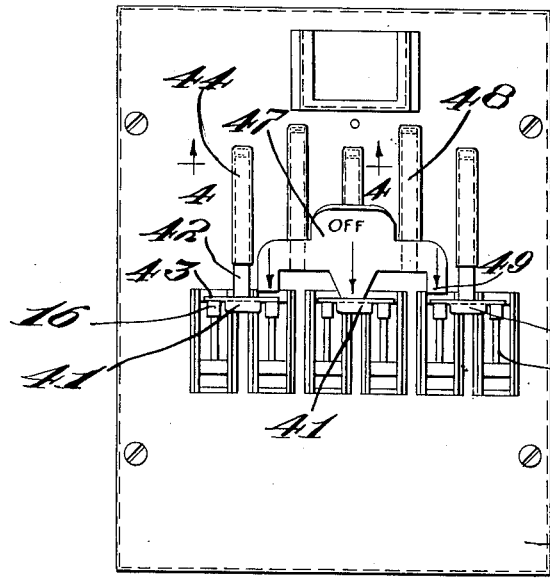
Fig. 1 is a front elevation of a distribution box with the cover in place.
Figure 2:
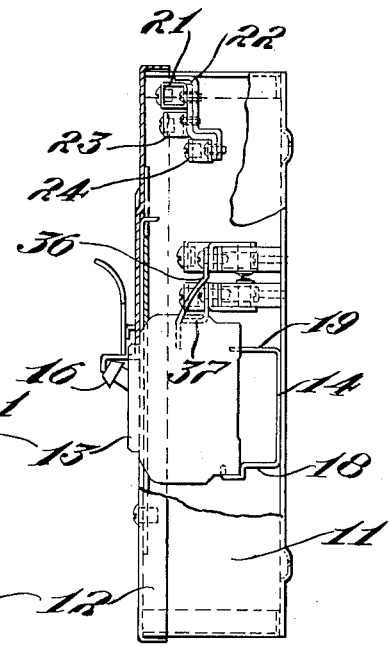
Fig. 2 is a side elevation of the box.
Figure 3:
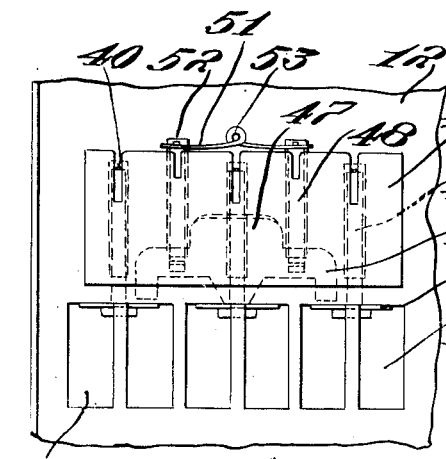
Fig. 3 is an enlarged partial rear elevation of the cover.

In the particular embodiment of the invention chosen for the purpose of illustration, the distribution box comprises a sheet metal box 11 with a cover 12. Enclosed within box 11 is a plurality of switches such as circuit breakers 13. A clip 14 holds each of the circuit breakers 13 so that its reset handle 16 projects through one of a series of adjacent apertures 17 (Fig. 3) in the front of cover 12. The clip 14 comprises two arms 18 and 19 supported by a connecting strip which is fastened to the rear wall of the box 11. A hook at the end of arm 18 engages a slot in the bottom of the circuit breaker 13. Additional support is given by arm 19 which projects into a slot in the rear of circuit breaker 13. The engagement of arms 18 and 19 with the slots in the circuit breaker 13 is maintained by straps 36 and 37, the electrical function of which will be described hereinafter.

Figure 10:
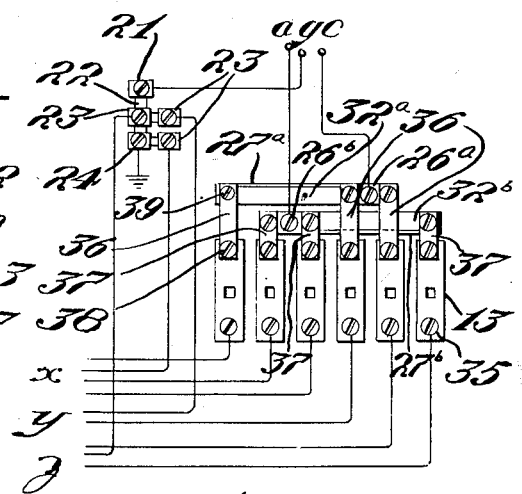
Fig. 10 is the circuit diagram.
Figure 4:
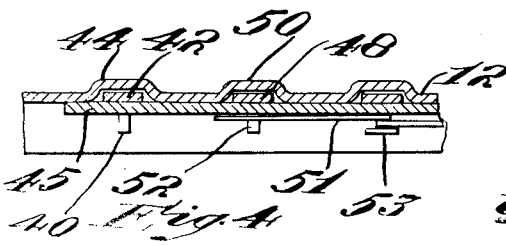
Fig. 4 is an enlarged cross-section on line 4—4 of Fig. 1.

As is shown in the wiring diagram Fig. 10, the single phase three-wire power supply circuit comprises two ungrounded wires $a$ and $c$ and a ground wire $g$. Wire $g$ is connected to a terminal 21 which is linked to terminals 23 and 24 by the straps 22. The grounded wires of the load circuits $x$, $y$ and $z$ are connected to the terminals 23. Terminal 24 is grounded. The wires $a$ and $c$ are connected to terminals $26^a$ and $26^b$ on bus bars $27^a$ and $27^b$, respectively.

Bus bar $27^a$ (Fig. 8) comprises two flanges $29^a$ and $30^a$ of unequal lengths bent at right angles to a connecting strip $28^a$. A block $32^a$ of insulating material supports the bus bar $27^a$. The connecting strip $28^a$ fastens to the top of an insulating block $32^a$ by screws 33 so that both the longer flange $29^a$ and the shorter flange $30^a$ extend over the front face of the block. The similarly formed bus bar $27^b$ is mounted on an insulating block $32^b$. The strip $28^b$ is fastened to the bottom of block $32^b$ with the flanges $29^b$ and $30^b$ projecting up over the front of the block. Screws 34 secure the blocks $32^a$ and $32^b$ to the rear wall of box 11. This arrangement permits the use of interchangeable parts for the bus bars $27^a$ and $27^b$ and for the insulating blocks $32^a$ and $32^b$ without interfering with an adjacent positioning of the two circuit breakers 13 associated with each of the load circuits $x$, $y$ and $z$.

The strap 36 (Fig. 9) connects one of the circuit breakers 13 in load circuit $x$ to the bus bar $27^a$. A screw 38 engages a slot 40 in one end of the strap 36 to fasten the strap to the bus bar $27^a$. A screw 39 in the top of circuit breaker 13 is inserted through a hole in the opposite end of strap 36. The second circuit breaker 13 in circuit $x$ is connected to bus bar $27^b$ by strap 37 which also has a slotted end for similarly engaging a screw in the bus bar. The circuit breakers 13 in circuits $y$ and $z$ are connected to bus bars $27^a$ and $27^b$ in a similar manner. The slot 40 is cut in one of the ends of straps 36 and 37 so that screw 38 can be loosened and the strap forced upwardly until the circuit breaker 13 can be removed without interrupting the power supply. A terminal 35 at the bottom of each circuit breaker 13 connects with one of the ungrounded wires of each of the load circuits $x$, $y$ and $z$.

An actuator 41 is mounted slidably upon the box cover 12 to operate conjointly the two circuit breakers 13 in the load circuit $x$. The actuator 41 comprises a tongue 42 and an arm 43. The tongue 42 extends through an opening into a guideway 44 embossed in the cover 12. To prevent the tongue 42 from leaving the guideway 44, a plate 45 is riveted to the rear of the cover 12. The travel of the tongue 42 in guideway 44 is limited by the movement of a tab 40 in a slot in the plate 45. The tob 40 is formed by bending a projecting finger at the end of the tongue 42 at a right angle to the tongue. At the opposite end of tongue 42 the arm 43 projects perpendicularly to engage the handles 16 of the adjacent circuit breakers 13 in load circuit. The arm 43 projects laterally so that the adjacent circuit breakers 13 can be spaced far enough apart to permit the free circulation of cooling air therebetween. The cooling air circulation is aided by the louver formed in the cover 12 by the guideway 44. Further cooling is provided by the radiation of heat from the handles 16 to the actuator 41. Two similar actuators 41 engage the handles 16 of the circuit breakers associated with the load circuits $y$ and $z$, respectively.

A movable member, such as handle 47, is provided to open all the circuit breakers 13 conjointly so that all the load circuits can be isolated from the power supply. The handle 47 comprises two tongues 48 and three fingers 49. Each tongue 48 engages a guideway 50 in cover 12 in a manner similar to that heretofore described in connection with tongue 42. Each of the fingers 49 projects downwardly to contact the top of the arm 43 of an actuator 41. A spring 51 engages a tab 52 at the upper end of each tongue 48 so that the handle 47 is maintained in a retracted position. The spring 51 is fastened to the cover 12 by a rivet 53.

When the circuit breakers 13 are closed, the reset handles 16 are at the top of their path of movement and each of the actuators 41 is in the retracted position with its arm 43 resting lightly upon the handles 16 of the adjacent circuit breakers 13. In this position the actuator does not interfere with the downward movement of the handles 16 under overload conditions.

When a load circuit is to be isolated from the power supply, the corresponding actuator 41 is moved downwardly by grasping the top of arm 43 until the handles 16 are forced to the bottom position in their path of travel. The conjoint movement of the handles 16 opens the circuit breakers 13 and disconnects the load circuit from the power supply. The actuator 41 is returned to the retracted position by moving the handles 16 to the closed position to reset the circuit breakers 13.

To disconnect all the load circuits simultaneously, the handle 47 is pulled downwardly. Each of the fingers 49 engages the top of the arm 43 of an actuator 41. The load circuits are opened by the corresponding actuators 41 as described above. When the handle 47 is released, it is returned to the retracted position by the spring 51. The load circuits are reconnected by individually closing the circuit breakers 13 by means of handles 16.

It should be understood that the present disclosure is for the purpose of illustration only and that this invention includes all modifications and equivalents which fall within the scope of the appended claims.

I claim:

1. A device for actuating a plurality of handle operated switches of the type housed in a distribution box for connecting an electrical supply circuit to a plurality of load circuits, said device comprising a cover for said box having a plurality of frontal apertures through which the respective switch handles project, and an actuator mounted on the cover to move between a retracted position and an advanced switch-actuating position, the actuator having a surface for engaging a plurality of said switch handles in moving from retracted to advanced position, the actuator being shaped so that the paths of the handles are unobstructed when the actuator is in retracted position whereby the switches may be operated independently of each other, said cover having a groove embossed in the underside so that the upper portion of the groove is disposed along the level of the upper surface of the cover, the groove extending lengthwise of the path of the movement of the actuator and the cover having an opening at one end of the groove, said actuator having a tongue extending through said opening and sliding in said groove.

2. A device according to claim 1, wherein a further actuator is provided in addition to said actuator and a movable member slidably mounted on the cover, said member having fingers for contacting said actuators as the member moves thereby simultaneously to operate the actuators.

ERNEST G. JOHANSSON.

REFERENCES CITED

The following references are of record in the file of this patent:

UNITED STATES PATENTS

| Number | Name | Date |
|---|---|---|
| 2,050,378 | Randall | Aug. 11, 1936 |
| 2,099,585 | Von Hoorn | Nov. 16, 1937 |
| 2,209,353 | Sachs | July 30, 1940 |
| 2,210,696 | West | Aug. 6, 1940 |
| 2,277,645 | Johnson | Mar. 24, 1942 |
| 2,289,108 | Eaton | July 7, 1942 |
| 2,336,425 | Shenton | Dec. 7, 1943 |
| 2,354,224 | Stein | July 25, 1944 |
| 2,372,083 | Johansson | Mar. 20, 1945 |
| 2,389,220 | Tredeau | Nov. 20, 1945 |